United States Patent Office 3,223,636
Patented Dec. 14, 1965

3,223,636
LEAD CORROSION INHIBITOR
Stephen J. Metro, Scotch Plains, Alfred H. Matuszak, Westfield, and Robert E. Barnum, Fanwood, N.J., assignors to Esso Research and Engineering Company, a corporation of Delaware
No Drawing. Filed May 23, 1961, Ser. No. 111,928
8 Claims. (Cl. 252—56)

This invention relates to the product obtained by reacting a low molecular weight aliphatic alcohol and a dicarboxylic acid, which product is useful as a lead corrosion inhibitor, and to oil compositions containing said product. Particularly, the invention relates to synthetic ester lubricating oil compositions containing a minor amount of the reaction product of an aliphatic alcohol with a dicarboxylic acid as a lead corrosion inhibitor.

The use of various diesters, polyesters and complex esters as lubricating oils is well known to the art and has been described in various patents, e.g. U.S. 2,723,286, 2,743,234 and 2,575,196. These ester oils are characterized by viscosity properties that are outstanding at both low and high temperatures, and in this respect are superior to the mineral oils. Because of their utility over extremely wide temperature ranges, the synthetic ester lubricating oils are widely used in the formation of lubricants for aircraft engines such as "turbo-jet," "turbo-prop" and "turbo-fan" aircraft. In such engines, lead-containing bearings are used and unfortunately, the synthetic esters per se are often corrosive to such bearings. The present invention resides in the discovery that a product obtained by reacting certain low molecular weight alcohols with dicarboxylic acids may be directly added to ester lubricating oils prepared from higher molecular weight alcohols in order to inhibit lead corrosion. At the same time, the additive product does not detract from the other desirable properties of the ester lubricating oil with which it is mixed.

The product of the invention is prepared by incompletely reacting about 1 to 8 moles of a $C_1$ to $C_5$ alcohol, such as methyl alcohol, ethyl alcohol, n-propyl alcohol and isopropyl alcohol, with a molar amount of an aliphatic dicarboxylic acid of 6 to 12 carbon atoms, such as adipic acid, azelaic acid, sebacic acid, etc. Preferably, 1 to 4 moles of a $C_1$ to $C_3$ alcohol is incompletely reacted per mole of the dicarboxylic acid. It has been found that a pure diester, such as diethyl sebacate, will not give the same results as the corresponding reaction product of the invention which is formed by heating sebacic acid and ethyl alcohol together, in the absence of a catalyst or water entrainer, and avoiding complete esterification. It is not quite clear what is obtained by this reaction, but it is believed that a principal product is acid molecules solvated by alcohol molecules. Specifically, it is believed in the light of molecular weight data, that this principal product comprises acid molecules having about 4 to 7 alcohol molecules loosely bonded to each acid molecule, perhaps by hydrogen bonds. In high temperature storage tests, these apparent bonds are believed to break and release the dicarboxylic acid to control lead corrosion. There may also be present unassociated acid and alcohol molecules. While dicarboxylic acids per se have been known as inhibitors of lead corrosion for ester oils, their use has been limited due to the very low solubility of dicarboxylic acids in the ester oil. For example, sebacic acid is a potent lead corrosion inhibitor, but is only soluble in diesters (e.g. di-2-ethylhexyl sebacate) in amounts of only 0.02 wt. percent at 0° F. This slight solubility militates against using sufficient sebacic acid to give the desired degree of lead corrosion control. On the other hand, a product of the invention prepared from sebacic acid and ethyl alcohol in molar ratios of 1:1 to 1:4, remained in a diester oil at concentrations of 0.20 weight percent at −10° F. during a 72 hour test period. This represents a sizable improvement and it is believed that the alcohol molecules associated with the acid molecules act as a solvating agent in increasing the solubility of the acid in ester oil. It is also possible that the products of the invention may contain half esters, and other materials which are unknown.

The lubricating compositions of the invention will comprise a major amount of an ester lubricating oil and about 0.001 to 5.0 wt. percent, preferably 0.01 to 2.0 wt. percent, based upon the total amount of the lubricant, of the lead corrosion inhibiting product of the invention.

The ester lubricating oils operable as base oils in the compositions of this invention comprise hydrocarbon chains interrupted with 2 to 10 ester linkages, which can be further interrupted with ether or thioether linkages. Included are diesters, polyesters, and complex esters.

The diesters are generally prepared from dicarboxylic acids fully esterified with monohydric alcohols, or from glycols fully esterified with monocarboxylic acids. The total number of carbon atoms in the diester molecule is generally about 18 to 36, preferably 20 to 28. Preferred dicarboxylic diesters are those of the formula:

ROOCR'COOR wherein each R may be the same or different, straight or branched chain alkyl radical of a monohydric alcohol having about 6 to 13 carbon atoms, while R' is a straight or branched chain $C_2$ to $C_8$ divalent saturated aliphatic hydrocarbon radical. Examples of such diesters include: di-2-ethylhexyl sebacate, di-$C_{10}$ Oxo sebacate, di-nonyl sebacate, di-2,2,4-trimethylpentyl sebacate, di-2-ethylhexyl azelate, di-2,2,4-trimethylpentyl azelate, di-$C_8$ Oxo azelate, di-n-heptyl isosebacate, di-$C_{10}$ Oxo adipate, di-nonyl adipate, di-$C_8$ Oxo adipate, di-2-ethylhexyl adipate, di-$C_7$ Oxo adipate, di-$C_8$ Oxo trimethyl adipate, di-$C_{13}$ Oxo pimelate, and coesters such as mono-$C_8$ Oxo, mono-$C_{10}$ Oxo adipate, etc. Other operable diesters are those prepared from glycols and monocarboxylic acids such as dipropylene glycol dipelargonate and polyethylene glycol 200 dicaproate.

Diesters prepared from the Oxo alcohols, which are isomeric mixtures of branched chain aliphatic primary alcohols, are particularly desirable. The Oxo alcohols have a high degree of branching in the hydrocarbon chain, which results in diester oils having low pour points and low viscosities at low temperatures. These alcohols are prepared from olefins, such as polymers and copolymers of $C_3$ and $C_4$ monoolefins, which are reacted with carbon monoxide and hydrogen in the presence of a cobalt-containing catalyst such as a cobalt carbonyl, at temperatures of about 300° to 400° F., and under pressures of about 1000 to 3000 p.s.i. to form aldehydes. The resulting aldehyde product is then hydrogenated to form the Oxo alcohol which is then recovered by distillation from the hydrogenation product.

Operable polyesters are prepared by reacting polyhydric alcohols such as trimethylolpropane and pentaerythritol with monocarboxylic acids such as butyric acid, caproic acid, caprylic acid, pelargonic acid, etc. to give the corresponding tri- or tetraesters.

The complex esters which may be used as the base oils are formed by esterification reactions between a dicarboxylic acid, a glycol, and an alcohol and/or a monocarboxylic acid. The more important complex esters may be represented by the following formulas:

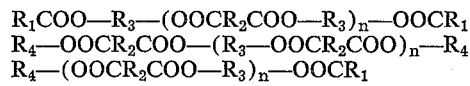

wherein: $R_1$ represents hydrocarbon radicals of a monocarboxylic acid; $R_2$ represents hydrocarbon radicals of dicarboxylic acids, e.g. alkanedioic acids; $R_3$ represents divalent hydrocarbon or hydrocarbon-oxy radicals, such as $-CH_2(CH_2)_n-$, or $-CH_2CH_2(OCH_2CH_2)_n-$, or $-CH_2CH(CH_3)OCH_2CH(CH_3)-$, derived from an alkylene glycol or polyalkylene glycol; $R_4$ represents hydrocarbon radicals of a monohydric alcohol. "$n$" in the complex ester molecule will usually range from 1 to 6 depending upon the product viscosity desired and is controlled by the relative molar ratio of the glycol or polyglycol to the dicarboxylic acid. In preparing the complex ester, there will always be some simple mono or diester formed, i.e. $n=0$, but this will generally be a minor portion.

Some specific materials used in preparing the above types of complex esters are as follows: alcohols having 6 to 13 carbon atoms such as n-butyl alcohol, 2-ethylbutyl alcohol, 2-ethylhexanol, n-hexyl alcohol, $C_8$ Oxo alcohol and $C_{10}$ Oxo alcohol, etc.; the corresponding fatty or monocarboxylic acids; $C_6$ to $C_{10}$ dicarboxylic acids such as sebacic, adipic and azelaic; and glycols such as polyethylene glycol. In general the complex esters will have a total of 20 to 80, preferably 40 to 65, carbon atoms.

These complex esters and methods for their preparation are known in the art and have been described in various patents.

The composition can also include other additives (e.g. 0.01 to 10.0 wt. percent each, based on the weight of the total composition). Included are oxidation inhibitors such as phenothiazine, dioctylphenothiazine, dioctyldiphenylamine, phenyl α-naphthylamine, p-aminodiphenylamine; viscosity index improvers such as polymethacrylates, polystyrene; anti-foamants such as dimethylsilicone polymers; anti-wear agents such as tricresyl phosphate; load-carrying agents; etc.

The additives of the invention, i.e. the product of $C_1$ to $C_5$ alcohol with $C_6$ to $C_{12}$ dicarboxylic acid is preferably prepared as follows:

1 to 8, preferably 1 to 4, moles of alcohol are mixed with 1 mole of dicarboxylic acid and heated under reflux conditions, in the absence of any esterification catalyst for 0.2 to 6.0 hours under atmospheric conditions, with the reflux being returned to the reactor. For most of the materials of the invention, the pot temperatures during the reaction will range from about 80° to 170° C. Preferably, the reactants are heated for about 1 or 2 hours. The degree of heating, i.e. time, temperature and pressure, of course, can be varied but esterification should be avoided, or at least limited so as to form as little ester as possible, e.g. 10% diester. After the above described heating, the residue is ready for use without any purification.

The invention will be further understood by reference to the following examples which include preferred embodiments of the invention.

EXAMPLE 1

Inhibitor A.—A partial reaction product of ethyl alcohol and sebacic acid was prepared as follows:

46 grams (1 mole) of ethyl alcohol was refluxed with 202 grams (1 mole) of sebacic acid in a flask equipped with a thermometer, stirrer and reflux condenser. The mixture was heated for one hour under reflux conditions with a pot temperature, i.e. liquid temperature ranging from 115 to 134° C., and a vapor temperature ranging from 76° to 81° C.

Inhibitors B to G.—A series of products was prepared in the general manner as A, but varying the reactants, the amounts of reactant, reaction times, etc. The products made, the reaction conditions, and their properties are summarized in Table I which follows:

TABLE I

| | INHIBITOR | | | | | | |
|---|---|---|---|---|---|---|---|
| | A | B | C | D | E | F | G |
| Reactants: | | | | | | | |
| Sebacic Acid, mole | 1 | 1 | 1 | 1 | | 1 | 1 |
| Adipic Acid, mole | | | | | 1 | | |
| Methyl Alcohol, moles | | | | | 4 | | |
| Ethyl Alcohol, moles | 1 | 2 | 3 | 4 | | 4 | 2 |
| Reaction Time, hours | 1 | 1 | 1 | 1 | 2 | 5 | 2 |
| Pot Temperature, ° C | 115–134 | 91–97 | 91–103 | 90–93 | 156 | 160 | 105 |
| Vapor Temperature, ° C | 76–81 | 108–130 | 78–83 | 78–79 | 100 | 110 | |
| Properties: | | | | | | | |
| Saponification No | 526 | 378 | 357 | 324 | | | |
| Percent H₂O [1] | 0.32 | 0.75 | 1.56 | 0.22 | 3.5 | 1.4 | |
| Total Acid No., mg. KOH/gm | 262 | 219 | 207 | 210 | 385 | 497 | 296 |
| Molecular weight [2] | | 521 | 513 | 377 | 517 | 618 | 464 |

[1] Wt. percent water in product determined by Karl Fischer analysis. Since all the water formed was retained in the inhibitor, the amount of ester present in terms of diester based on the percent water, ranges from about 2.0 wt. percent in Inhibitor A to about 27 wt. percent in Inhibitor E. A different concentration of ester is indicated by a comparison of the various Saponification Numbers and the Total Acid Numbers. However, it is believed that the Saponification Numbers (which are in terms of mg.KOH/gm.) are unreliable for this purpose and that the water content represents a true indication of ester formation.
[2] Average molecular weight of Inhibitor Product as indicated by boiling point rise technique of determining molecular weight.

To show the effect on lead corrosion inhibition of the products of the invention, various compositions were made up containing Inhibitor B, and stored at a temperature of 185° F. At designated time intervals, samples of the compositions were tested for lead corrosion in accordance with MIL-L-7808-B specification. Briefly described, this lead corrosion test was carried out by rapidly rotating a weighed bimetallic strip consisting of a lead strip and a copper strip bound together, in the oil sample maintained at 325° F., while air is bubbled through the sample for one hour. The strip is reweighed after the test period and the weight change is thereby determined and reported in terms of mg./sq. in. of lead surface. A weight loss is reported as a minus change (—), while a weight gain is indicated as a plus change (+).

The following compositions were prepared and tested, wherein all parts are by weight.

Composition 1

This composition was prepared by simple mixing of 100 parts of di(2-ethylhexyl) sebacate, 1 part of phenothiazine as an oxidation inhibitor and 1 part of the $C_8$ Oxo diester of pyromellitic acid dianhydride (PMDA), all of said parts being by weight.

Composition 2

This synthetic lubricating oil composition consisted of a base oil consisting of a mixture of 25 volume percent di-2-ethylhexyl sebacate and 75 volume percent of a complex ester material, said mixture further containing 1 wt. percent of phenothiazine and .001 wt. percent of a silicone antifoamant, said wt. percent being based upon the combined weight of the di-2-ethylhexyl sebacate and complex ester material. The complex ester material used in this composition consists of about 34 wt. percent of di-2-ethylhexyl sebacate and about 66 wt. percent of complex ester of the general formula: 2-ethylhexyl alcohol-(sebacic acid-polyethylene glycol 200)$_x$-sebacic acid-2-ethylhexyl alcohol where $x$ averages about 1.7. This complex ester material was prepared by simultaneously reacting 1 molar proportion of polyethylene glycol of about 200 molecular weight, 2 molar proportions of 2-ethylhexyl alcohol and 2 molar proportions of sebacic acid.

Composition 3

This oil composition contained a base oil consisting of 79 volume percent of a $C_8/C_{10}$ Oxo adipate coester prepared as described below, 20 volume percent of di-2-ethylhexyl sebacate and 1 volume percent of a complex ester material. To 100 parts by weight of the base oil, there was added by simple mixing, 1 part by weight of tricresyl phosphate, 0.75 part by weight of phenothiazine, 0.7 part by weight of the $C_8$ Oxo diester of pyromellitic dianhydride, 0.015 part by weight of sebacic acid and 0.001 part by weight of dimethyl silicone having a viscosity of 25° C. of 60,000 cs.

The complex ester material was prepared by simultaneously reacting one molar proportion of polyethylene glycol of about 200 average molecular weight (PEG), 2 molar proportions of $C_8$ Oxo alcohol and 2 molar proportions of adipic acid.

The $C_8$ Oxo diester of pyromellitic dianhydride (PMDA) was the same used in preparing Composition 1 and has the structure:

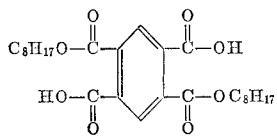

The $C_8/C_{10}$ Oxo adipate mixed diester, i.e. coester, was prepared in two stages. In the first stage one molar proportion of adipic acid was reacted with one molar proportion of a $C_{10}$ Oxo alcohol to make the $C_{10}$ Oxo adipate half ester. One molar proportion of the $C_{10}$ Oxo adipate half ester was then reacted with 1.1 molar proportion (10% excess) of $C_8$ Oxo alcohol to make a mixed $C_8/C_{10}$ Oxo adipate ester, the excess alcohol being removed by distillation. The $C_{10}$ Oxo alcohol used was prepared by subjecting tripropylene to the Oxo process, while the $C_8$ Oxo alcohol was correspondingly prepared from a $C_7$ olefin derived from a propylene-butylene feed.

Inhibitor B was added to each of the Compositions 1 to 3. For example, 0.1 part by weight of Inhibitor B was added by simple mixing with 100 parts by weight of Composition 1.

Lead corrosivity, determined as previously described, obtained from Compositions 1 to 3, along with the results of corrosivity tests on corresponding compositions with Inhibitor B, are summarized in Table II which follows:

TABLE II

|  | 14 Days at 185° F. | | 45 Days at 185° F. | |
| --- | --- | --- | --- | --- |
|  | TAN* | Lead Corrosion (mg./in.²) | TAN* | Lead Corrosion (mg./in.²) |
| Composition 1 | | 0 | 3.88 | −126 |
| Composition 1 plus 0.1% Inhibitor B | 3.94 | 0 | 4.01 | −6.6 |
| Composition 2 | 1.60 | −0.2 | | −48 |
| Composition 2 plus 0.2% Inhibitor B | 2.15 | 0.4 | | −1.6 |
| Composition 3 | 4.2 | −67.0 | 4.4 | −140 |
| Composition 3 plus 0.2% Inhibitor B | 4.2 | +7.7 | 4.7 | −69 |

*Total Acid No. in terms of mg. KOH/gm.

As seen by the above table, a very significant drop in the corrosivity of the various ester oil compositions toward lead was achieved in all cases by the use of a relatively small amount of Inhibitor B. For example, Composition 1 without Inhibitor B, after being stored 45 days at 185° F., showed an excessive weight loss of 126 mg. of lead per square inch of surface during the one hour lead corrosion test previously described. By the addition of 0.1 part by weight of Inhibitor B to 100 parts by weight of Composition 1, the lead corrosion was reduced substantially giving only 6.6 mg. wt. loss per square inch of the lead test strip.

Compositions 4 to 15

A series of compositions was prepared having the same formulation as Composition 3 except that in place of Inhibitor B, Inhibitors A, and C to G were used. Also for comparison purposes, similar compositions were prepared using dimethyl adipate, diethyl adipate, adipic acid and sebacic acid in place of the inhibitors of the invention. These compositions were tested for lead corrosion upon being prepared, and were again tested for lead corrosion after being stored for either 4 or 5 days at 230° F. Several of the compositions were also tested for corrosivity to copper, magnesium, iron, aluminum and silver according to the 347° F. Oxidation Corrosion Stability (O.C.S.) test described in Military Specification MIL-7808-C. In addition, several of the compositions were stored at −10° F. for 3 days to determine if any of the inhibitors of the invention would separate from their respective compositions.

The compositions tested and the results obtained are summarized in Table III which follows:

tion against lead corrosion. Composition 15 is for comparison and represents tests run on the base Composition

TABLE III

| | Composition | | | | | | | | | | | |
|---|---|---|---|---|---|---|---|---|---|---|---|---|
| | 4 | 5 | 6 | 7 | 8 | 9 | 10 | 11 | 12 | 13 | 14 | 15 |
| Inhibitor added to Composition 3 | .1% A | .1% B | .1% C | .1% D | .2% E | .2% F | .2% G | .2% dimethyl adipate | .2% diethyl adipate | .02% adipic acid | .02% sebacic acid | None |
| Properties, 347° F. O.C.S.: | | | | | | | | | | | | |
| Cu | .11 | 0.18 | 0.17 | 0.20 | | | | | | | | |
| Mg | .01 | 0.01 | 0.01 | 0.01 | | | | | | | | |
| Fe | .03 | 0.03 | 0.02 | 0.01 | | | | | | | | |
| Al | .01 | 0.06 | 0.05 | 0.04 | | | | | | | | |
| Ag | .01 | 0.01 | 0.01 | 0.02 | | | | | | | | |
| TAN | | 3.57 | | 3.70 | | | | | | | | |
| K.V. at 100° F. cs | 12.88 | | | 12.90 | | | | | | | | |
| Storage Stability, 3 days at −10° F | Clear | Clear | Clear | Clear | | | | | | | | |
| Lead Corrosion Test: | | | | | | | | | | | | |
| Initial Pb. Corr | | | | | 0 | 0 | 0 | 0 | 0 | 0 | 0 | 0 |
| TAN | 3.2 | 3.3 | 3.3 | 3.4 | 3.56 | 3.33 | 3.32 | 2.9 | 2.76 | 2.91 | 2.86 | 2.79 |
| 4 days at 230° F.: | | | | | | | | | | | | |
| Pb. corr. (mg./in.²) | +6.0 | −11.0 | −1.0 | −4.0 | | | | | | | | |
| TAN | 4.39 | 3.97 | 4.65 | 4.20 | | | | | | | | |
| 5 days at 230° F.: | | | | | | | | | | | | |
| Pb. corr. (mg./in.²) | | | | | +1 | +1 | +2 | −133 | −77 | −162 | −45 | −141 |
| TAN | | | | | 4.10 | 4.80 | 4.19 | 4.64 | 3.71 | 3.48 | 3.59 | 4.30 |

As seen by Table III a small amount of the inhibitors of the invention is very effective in preventing lead corrosion, and at the same time does not contribute to any undesirable properties. Specifically, Compositions 4 to 7 illustrate that 0.1 wt. percent of the various inhibitors resulted in compositions having acceptable oxidation corrosion stability to copper, magnesium, iron, aluminum and silver. In addition, each of these compositions remained clear when stored for 3 days at −10° F. thereby demonstrating the ability of the inhibitor additive to remain in solution. A series of lead corrosion tests were carried out as well as various determinations of the total acid number (TAN) were made. In regard to Compositions 4 to 7, it is seen that four days' storage at 230° F. showed very little increase in lead corrosion and also very slight increase in the total acid number. Similar results with regard to lead corrosion and increase in acidity, as measured by the total acid number, are demonstrated for Compositions 8, 9 and 10 of the invention. For example, Composition 8 shows adding 0.2 wt. percent of Inhibitor E resulted in a composition showing no initial lead corrosion and a total acid number of 3.56. When this composition was maintained for 5 days at 230° F., it then showed a lead corrosion of 1 mg./sq. in., while the total acid number had increased to 4.10. This was equivalent to two years of storage at normal ambient temperatures, e.g. about 75° F. In comparison, Compositions 11 and 12 demonstrate that use of a pure diester, even though made from the same acid and alcohol used in preparing the compositions of the invention, gives very poor results with regard to lead corrosion inhibition. Similarly, poor results are obtained by Composition 13 in which .02 wt. percent of adipic acid was used. Admittedly, the 0.02 wt. percent of adipic acid is only a ⅕ of the amount of inhibitor used in Compositions 4 to 7. However, the .02 wt. percent adipic acid is the maximum amount of adipic acid that was soluble in the base composition at 0° F. In other words, if a larger amount of adipic acid than this is used, it will begin to separate from the compositions at temperatures of 0° F. or lower, which in turn would militate against use of the composition in arctic or cold regions. Composition 14 illustrates the use of an additional 0.02 wt. percent of sebacic acid (i.e. in addition to the 0.015 part by weight of sebacic acid already present in the base Composition 3). Composition 14 contained the maximum amount of sebacic acid that can be retained in the composition at a temperature of 0° F. As seen by the lead corrosion data, this amount of sebacic acid was insufficient to give adequate protection against lead corrosion. Composition 15 is for comparison and represents tests run on the base Composition 3 per se, i.e. containing no additional inhibitor. Thus, while Composition 3 showed a weight loss of 141 mg./sq. in. of lead surface after the composition was stored for 5 days at 230° F., the addition of .2 wt. percent of inhibitors E, F, or G reduced the lead corrosion down to +1 or +2 as is demonstrated by Compositions 8, 9 and 10. Although not directly comparable because of a day's difference in storage before testing, it is however obvious that Inhibitors A to D and Compositions 4 to 7, respectively also greatly inhibited lead corrosion.

In sum, the present invention relates to products obtained by heating a saturated dicarboxylic acid and a saturated monohydric alcohol under non-esterifying conditions, i.e. conditions to at least minimize esterification. The material obtained will have an average molecular weight substantially in excess of the molecular weight of a diester of said dicarboxylic acid and said alcohol. In general, the material obtained will have a saponification number within the range of 200 to 600 mg. KOH/gm.; a total water content of less than 5 wt. percent, based on the weight of the total composition, a total acid number within the range of 150 to 600 mg. KOH/gm., and an average molecular weight within the range of 300 to 700 as determined by boiling point rise. Actually some ester will generally be formed, but the total amount of ester, in terms of diester will generally be less than 30 wt. percent of the total material. Larger quantities of ester formation are not particularly harmful but will reduce the concentration of desired active lead corrosion inhibitor present so that a larger amount of inhibitor material is required. On the other hand, by minimizing the amount of ester formed, a higher percentage of active lead corrosion inhibiting material is produced so that a lesser amount of total inhibitor material is needed to achieve the desired degree of lead corrosion inhibition in oil.

What is claimed is:
1. An ester lubricating oil composition for lubricating in the presence of lead-containing bearings, comprising a major amount of a synthetic carboxylic acid ester lubricating oil having a tendency to corrode lead, and a lead corrosion inhibiting amount, within the range of 0.1 to 2.0 wt. percent, of a product formed by reacting 1 to 8 molar proportions of $C_1$ to $C_5$ saturated aliphatic monohydric alcohol with a molar proportion of a $C_6$ to $C_{12}$ saturated aliphatic dicarboxylic acid by heating under reflux conditions for about 0.2 to 6.0 hours, in the absence of an esterification catalyst, whereby said product contains less than 30 wt. percent diester of said alcohol and said dicarboxylic acid, and has a total acid number within the range of 150 to 600 mg. KOH/gm., and an average molecular weight within the range of 300 to 700 as determined by boiling point rise.

2. A lubricatiing oil composition according to claim 1, wherein said alcohol is methyl alcohol and said dicarboxylic acid is adipic acid.

3. A lubricating oil composition according to claim 1, wherein said alcohol is ethyl alcohol and said dicarboxylic acid is sebacic acid.

4. A lubrcating oil composition according to claim 1, wherein said alcohol is methyl alcohol and said dicarboxylic acid is sebacic acid.

5. An ester lubricating oil composition for lubricating in the presence of lead-containing bearings, comprising a major amount of a synthetic carboxylic acid ester lubricating oil having a tendency to corrode lead, and about 0.1 to 2.0 wt. percent of a lead-corrosion inhibiting product formed by heating a mixture of 1 to 4 molar proportions of a $C_1$ to $C_3$ aliphatic saturated monohydric alcohol with a molar proportion of a $C_6$ to $C_{12}$ aliphatic saturated dicarboxylic acid under reflux conditions for about 1 to 2 hours in the absence of an esterification catalyst at atmospheric conditions and retaining any water formed during refluxing in said product, whereby said product contains less than 30 wt. percent diester of said alcohol and said dicarboxylic acid.

6. A lubricating oil composition according to claim 5, wherein the amount of said product is about 0.1 to about 0.2 wt. percent.

7. A lubricating oil composition according to claim 5, wherein said synthetic carboxylic acid ester lubricating oil is a diester of a $C_6$ to $C_{13}$ saturated monohydric alcohol and a $C_4$ to $C_{10}$ saturated aliphatic dicarboxylic acid.

8. A lubricating oil composition for lubricating in the presence of lead-containing bearings, comprising a major amount of a carboxylic acid ester lubricating oil having a tendency to corrode lead, and about 0.1 to 2.0 wt. percent of a lead-corrosion inhibiting product formed by heating together 1 to 8 molar proportions of $C_1$ to $C_5$ saturated aliphatic monohydric alcohol per molar proportion of a $C_6$ to $C_{12}$ saturated aliphatic dicarboxylic acid at a pot temperature within the range of about 80° to 170° C., at atmospheric pressure, for about 0.2 to 6.0 hours, in the absence of an esterification catalyst, and retaining any water of reaction in said product.

References Cited by the Examiner

UNITED STATES PATENTS

| | | | |
|---|---|---|---|
| 1,991,391 | 2/1935 | Izard | 260—485 |
| 2,006,555 | 7/1935 | Izard | 260—485 |
| 2,204,598 | 6/1940 | Humphreys | 252—56 X |
| 2,334,158 | 11/1943 | Von Fuchs | 44—70 |
| 2,417,281 | 3/1947 | Wasson et al. | 252—56 X |
| 2,485,376 | 10/1949 | Glavis et al. | 252—56 X |
| 2,682,489 | 6/1954 | Von Fuchs | 252—56 |
| 2,788,326 | 4/1957 | Bondi et al. | 252—56 |
| 2,802,787 | 8/1957 | Matuszak et al. | 252—56 |
| 2,971,915 | 2/1961 | Borsoff et al. | 252—56 |
| 3,010,906 | 11/1961 | Signouret et al. | 252—56 |

FOREIGN PATENTS 577,452    6/1959    Canada.

OTHER REFERENCES

Cohen et al.: Aliphatic Esters, Properties and Lubricant Applications, Industrial and Engineering Chemistry, vol. 45, No. 8, pp. 1766–1775.

DANIEL E. WYMAN, *Primary Examiner.*

JULIUS GREENWALD, *Examiner.*